United States Patent
Nouso

[11] Patent Number: 5,301,115
[45] Date of Patent: Apr. 5, 1994

[54] APPARATUS FOR DETECTING THE TRAVEL PATH OF A VEHICLE USING IMAGE ANALYSIS

[75] Inventor: Kazunori Nouso, Kanagawa, Japan
[73] Assignee: Nissan Motor Co., Ltd., Yokohama, Japan
[21] Appl. No.: 707,144
[22] Filed: May 31, 1991
[30] Foreign Application Priority Data
    Jun. 1, 1990 [JP] Japan .................. 2-141269
[51] Int. Cl.⁵ .............................. G06F 15/50
[52] U.S. Cl. .................. 364/460; 364/461; 364/424.02; 348/118; 348/149
[58] Field of Search ............ 364/443, 444, 424.02, 364/572, 575, 424.01, 460; 358/103; 180/167, 168, 169

[56] References Cited
U.S. PATENT DOCUMENTS

| | | | |
|---|---|---|---|
| 4,819,169 | 4/1989 | Saitoh et al. | 364/424.02 |
| 4,926,364 | 5/1990 | Brotherton | 364/575 |
| 4,933,864 | 6/1990 | Evans, Jr. et al. | 364/460 |
| 4,970,653 | 11/1990 | Kenue | 364/424.02 |
| 5,087,969 | 2/1992 | Kamada et al. | 358/103 |
| 5,170,352 | 12/1992 | McTamaney et al. | 364/424.02 |

FOREIGN PATENT DOCUMENTS
63-142478  6/1988  Japan.

Primary Examiner—Thomas G. Black
Assistant Examiner—Michael Zanelli
Attorney, Agent, or Firm—Lowe, Price, LeBlanc & Becker

[57] ABSTRACT

An apparatus for detecting a vehicle path along which a vehicle is traveling. An image of a road presented in front of the vehicle is inputted at intervals of time. The inputted image is processed to detect edge points forming edges in the inputted image and edge gradients at the respective edge points. At least one straight line is assumed. Edge points at which the edge gradients are in a predetermined range determined by the gradient of the assumed straight line are extracted. The extracted edge points are used to calculate an approximate straight line. The approximate straight line has a greatest number of extracted edge points at which the edge gradients are substantially the same. The assumed straight line and the approximate straight line are averaged to provide a new straight line representing one of road sides and/or lane markers.

9 Claims, 11 Drawing Sheets

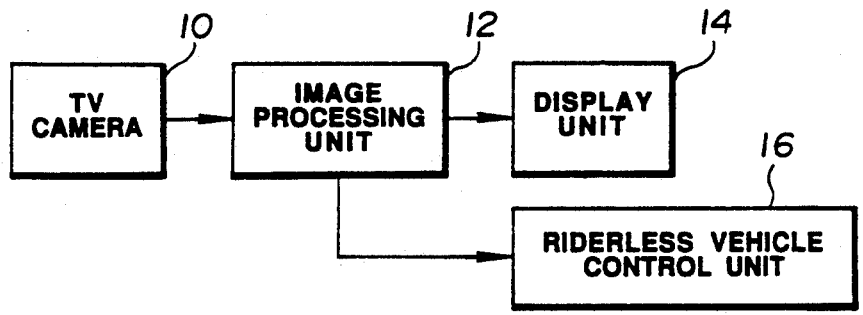
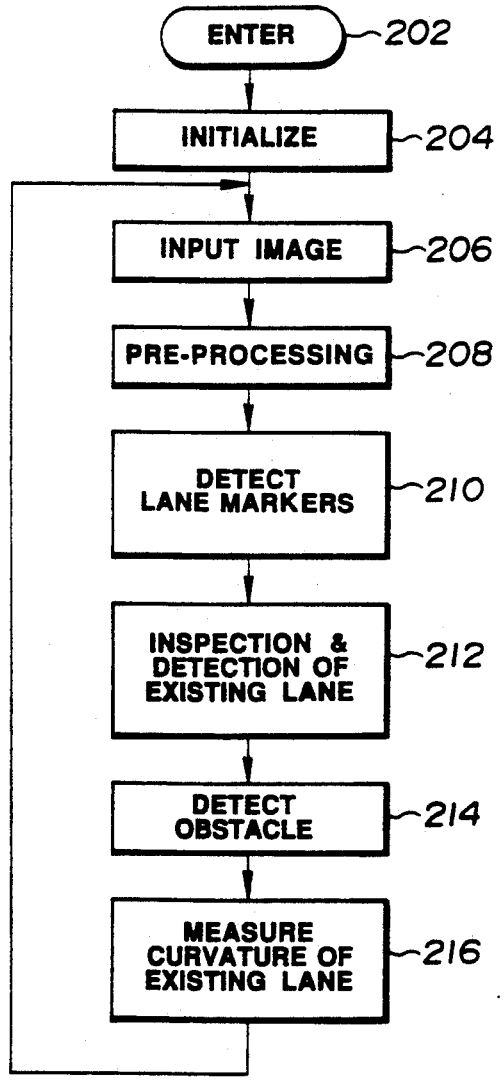
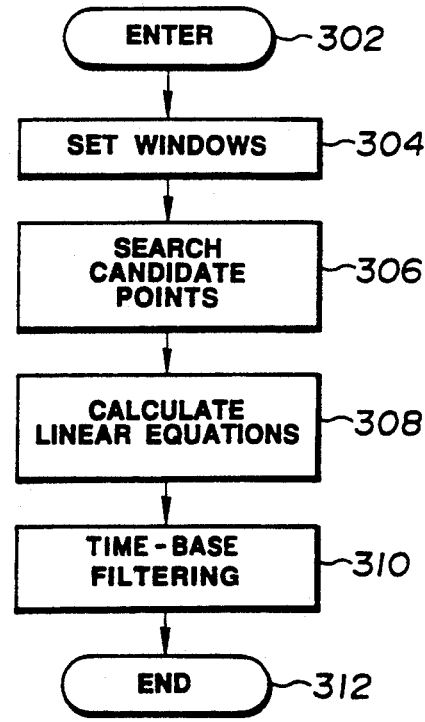

FIG. 6
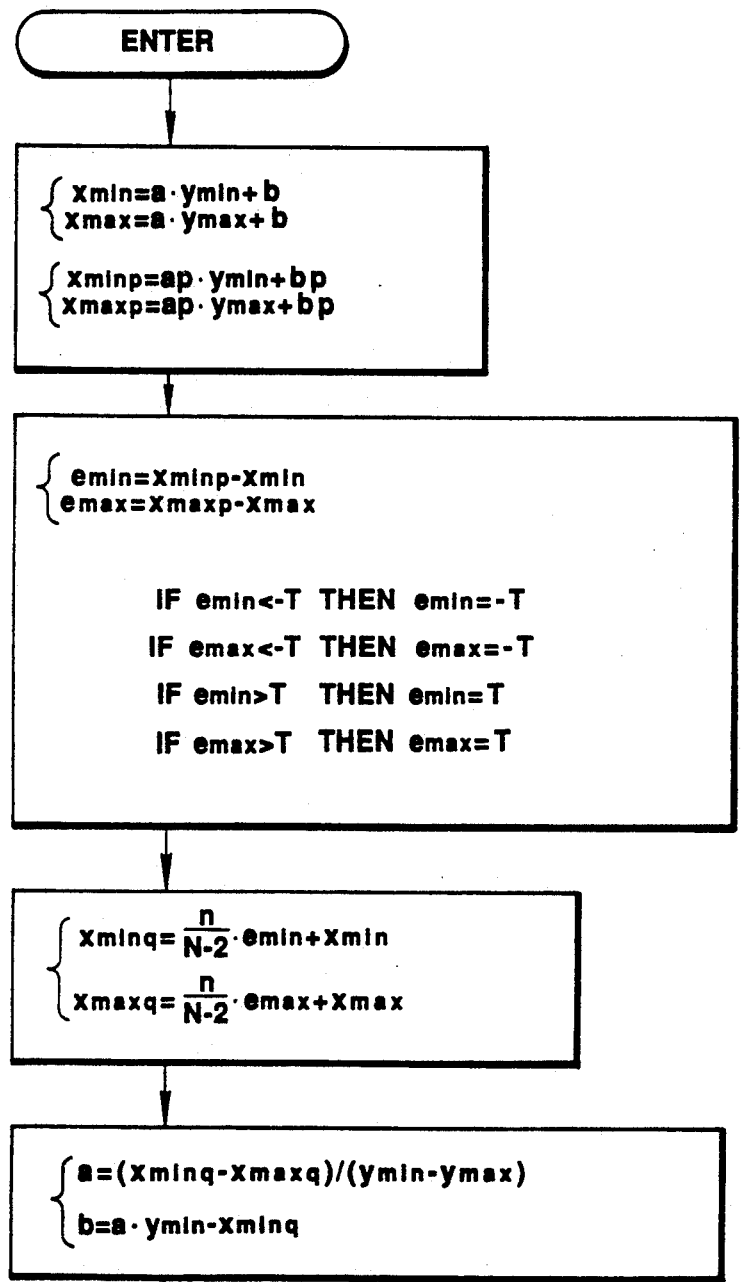
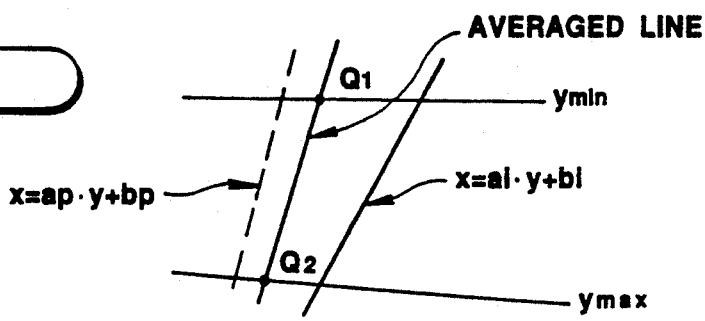

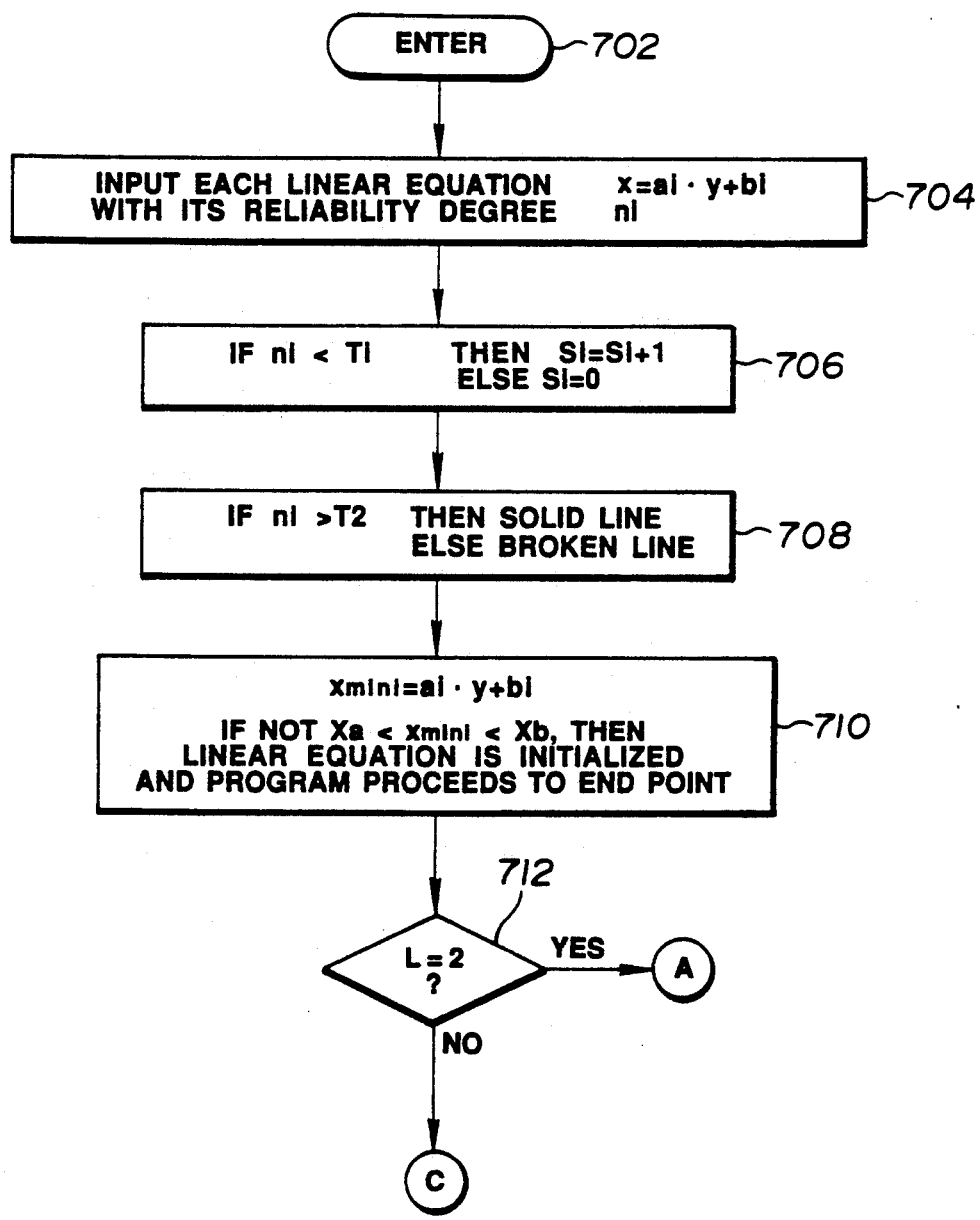

$xmax1 = a1 \cdot ymax + b1$
$xmax2 = a2 \cdot ymax + b2$
$xmax3 = a3 \cdot ymax + b3$ IF $xmax1 + \alpha >$ xmax2, THEN FIRST STRAIGHT LINE IS INITIALIZED. FOLLOWING THIS, PROGRAM PROCEEDS TO END POINT.

IF $xmax2 + \alpha >$ xmax3, THEN

THIRD STRAIGHT LINE IS INITIALIZED. FOLLOWING THIS, PROGRAM PROCEEDS TO END POINT.

---

IF FIRST STRAIGHT LINE IS BROKEN LINE AND SECOND STRAIGHT LINE IS SOLID LINE, THEN

SECOND LINEAR EQUATION IS STORED AS EXRESSING THIRD STRAIGHT LINE, FIRST LINEAR EQUATION IS STORED AS EXPRESSING SECOND STRAIGHT LINE, FIRST STRAIGHT LINE IS INITIALIZED, AND EXISTING LANE IS JUDGED TO SECOND LANE. FOLLOWING THIS, PROGRAM PROCEEDS TO END POINT.

IF THIRED STRAIGHT LINE IS BROKEN LINE AND SECOND STRAIGHT LINE IS SOLID LINE, THEN

SECOND LINEAR EQUATION IS STORED AS EXPRESSING FIRST STRAIGHT LINE, THIRD LINEAR EQUATION IS STORED AS EXPRESSING SECOND STRAIGHT LINE, THIRD STRAIGHT LINE IS INITIALIZED, AND EXISTING LANE IS JUDGED TO FIRST LANE. FOLLOWING THIS, PROGRAM PROCEEDS TO END POINT.

726

(D)

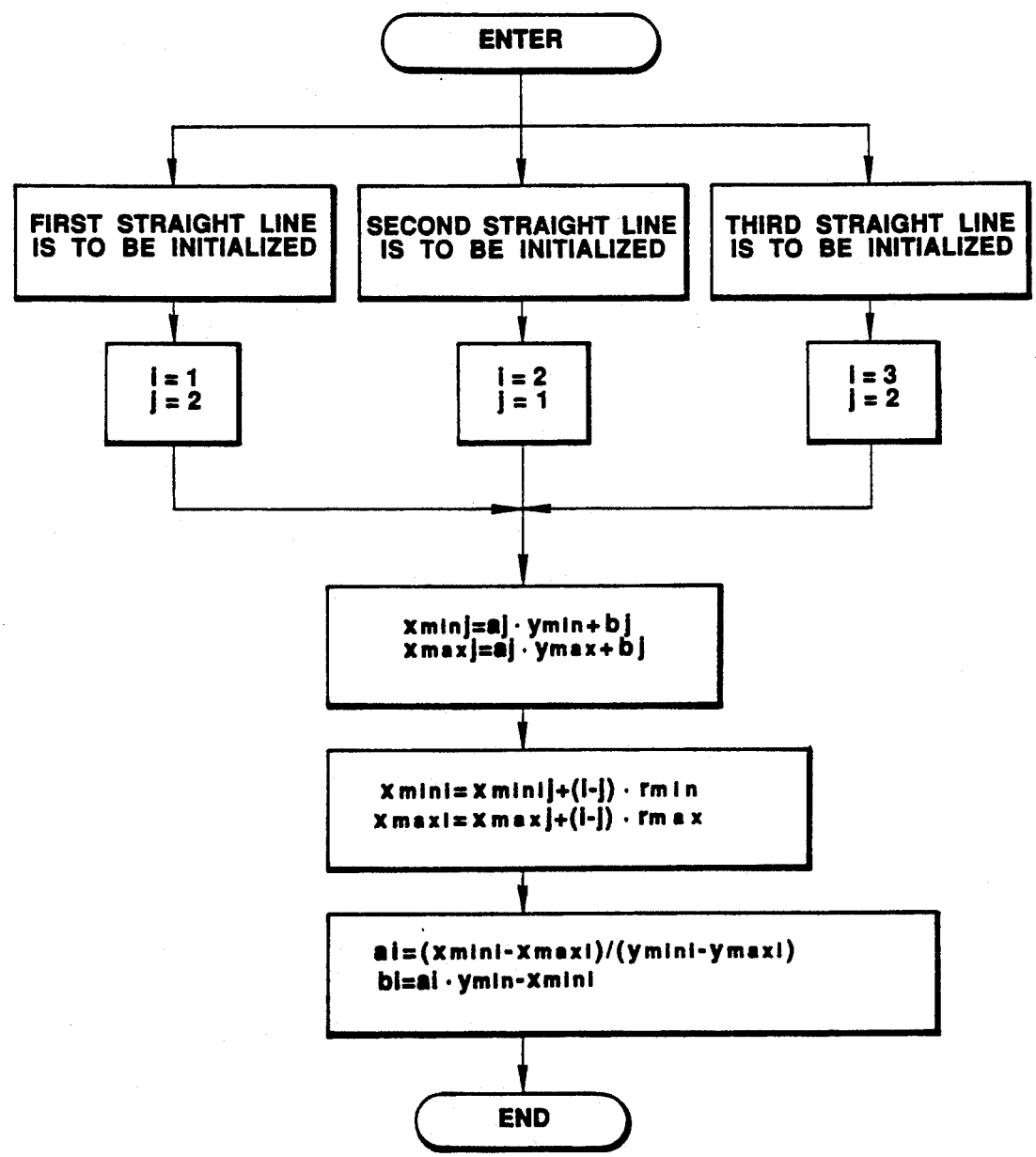

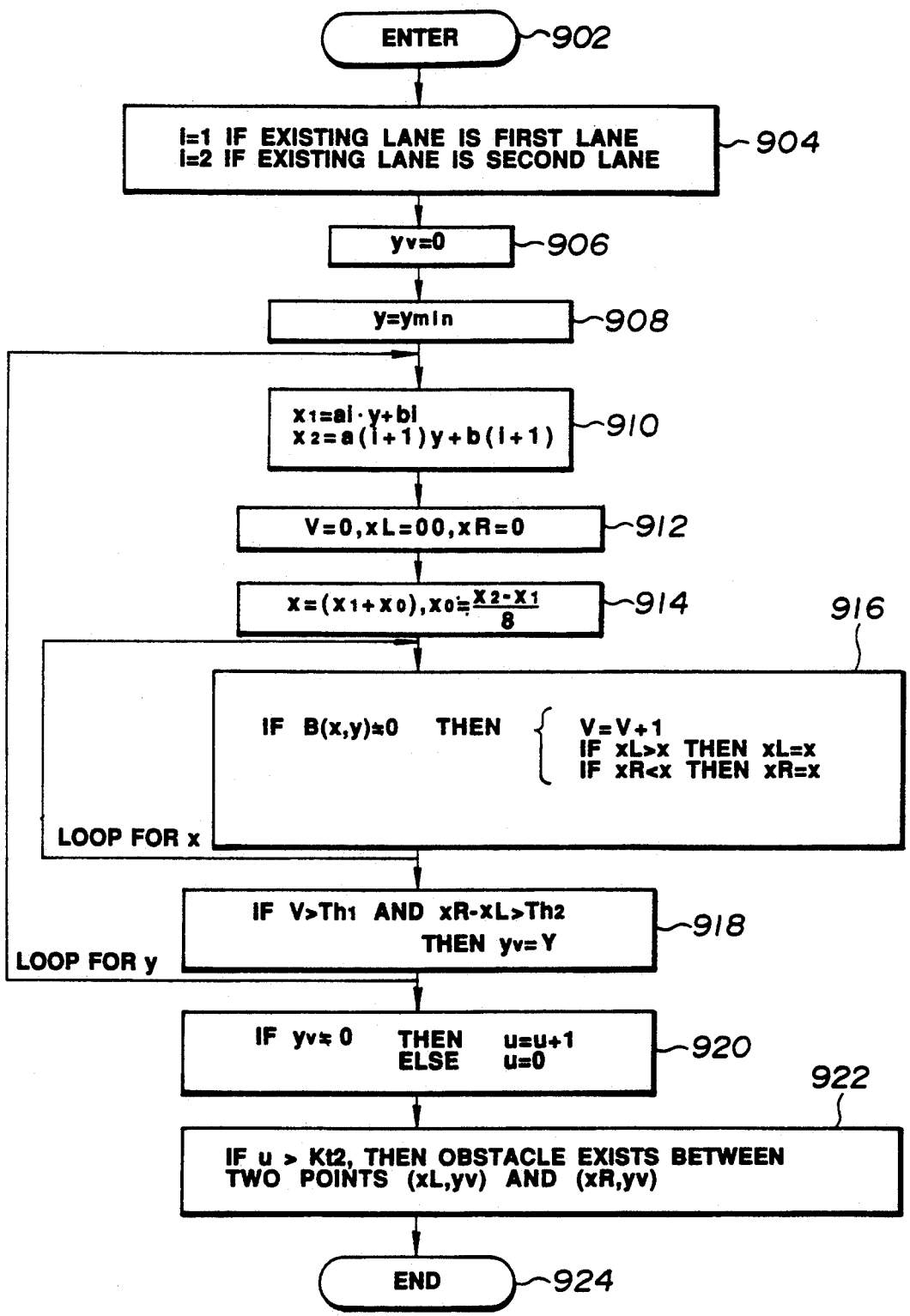

APPARATUS FOR DETECTING THE TRAVEL PATH OF A VEHICLE USING IMAGE ANALYSIS

BACKGROUND OF THE INVENTION

This invention relates to an apparatus detecting a vehicle path along which a vehicle, such as a riderless vehicle, is traveling.

For example, Japanese Patent Kokai No. 63-142478 discloses a conventional vehicle path detecting apparatus employing a television camera for inputting an image of a road scene presented in front of a vehicle. The inputted image is processed to extract candidate points for pixels forming white straight lines. A Hough conversion is applied for the extracted candidates to detect straight lines representing the respective white straight lines. In order to increase the accuracy with which the white straight lines are detected, the edge points directed in the vertical direction are removed from the candidate points.

With such a conventional apparatus, however, it takes much time to detect the vehicle path since the Hough conversion is made for all of the candidate points. Furthermore, it is impossible to detect the road sides which are not defined by white lines and also to measure the degree of curvature of the road.

SUMMARY OF THE INVENTION

Therefore, it is a main object of the invention to provide an improved vehicle path detecting apparatus which can detect a vehicle path in a shorter time with higher accuracy.

Another object of the invention is to provide an improved vehicle path detecting apparatus which can detect the road sides.

Still another object of the invention is to provide an improved vehicle path detecting apparatus which can detect the degree of curvature of the road.

There is provided, in accordance with the invention, an apparatus for detecting a vehicle path along which a vehicle is traveling. The apparatus comprises image input means for inputting an image of a road presented in front of the vehicle at intervals of time, edge point detecting means for processing the inputted image to detect edge points forming edges in the inputted image and edge gradients at the respective edge points, means for assuming at least one straight line having a gradient, means for extracting edge points at which the edge gradients are in a predetermined range determined by the gradient of the assumed straight line, means for calculating an approximate straight line from the extracted edge points, the approximate straight line having a greatest number of extracted edge points at which the edge gradients are substantially the same, and means for averaging the assumed straight line and the approximate straight line to provide a new straight line representing one of road sides and/or lane markers.

BRIEF DESCRIPTION OF THE DRAWINGS

This invention will be described in greater detail by reference to the following description taken in connection with the accompanying drawings, in which:

FIG. 1 is a schematic diagram showing one embodiment of a vehicle path detecting apparatus of the invention;

FIG. 6 is a flow diagram of the programming of the digital computer as it is used to perform the time-base filtering process;

FIG. 8 is a flow diagram of the programming of the digital computer as it is used to perform the initializing process; and FIG. 9 is a flow diagram of the programming of the digital computer as it is used to detect an obstacle on the existing lane.

DETAILED DESCRIPTION OF THE INVENTION

With reference to the drawings, and in particular to FIG. 1, there is shown a vehicle path detecting apparatus embodying the invention. The vehicle path detecting apparatus comprises a television camera 10, an image processing unit 12, and a display unit 14. The television camera 10 is mounted on a vehicle and focused to the road scene presented in front of the vehicle. The image processing unit 12 includes an image memory which receives a video signal from the television camera 10 and digitally stores an image of the road scene. The stored image $A(x,y)$ is represented by an array of 256×240 of points or pixels each assigned a value representative of its intensity (darkness). The image processing unit 12 processes the image stored in the image memory to detect the vehicle path. For this purpose, the image processing unit 12 employs a digital computer which includes a central processing unit, a random access memory, a read only memory, buffers, counters and an input/output control circuit. The image processing unit 12 outputs the results to the display unit 14 and also to a riderless vehicle control unit 16.

Figures 2, 7:
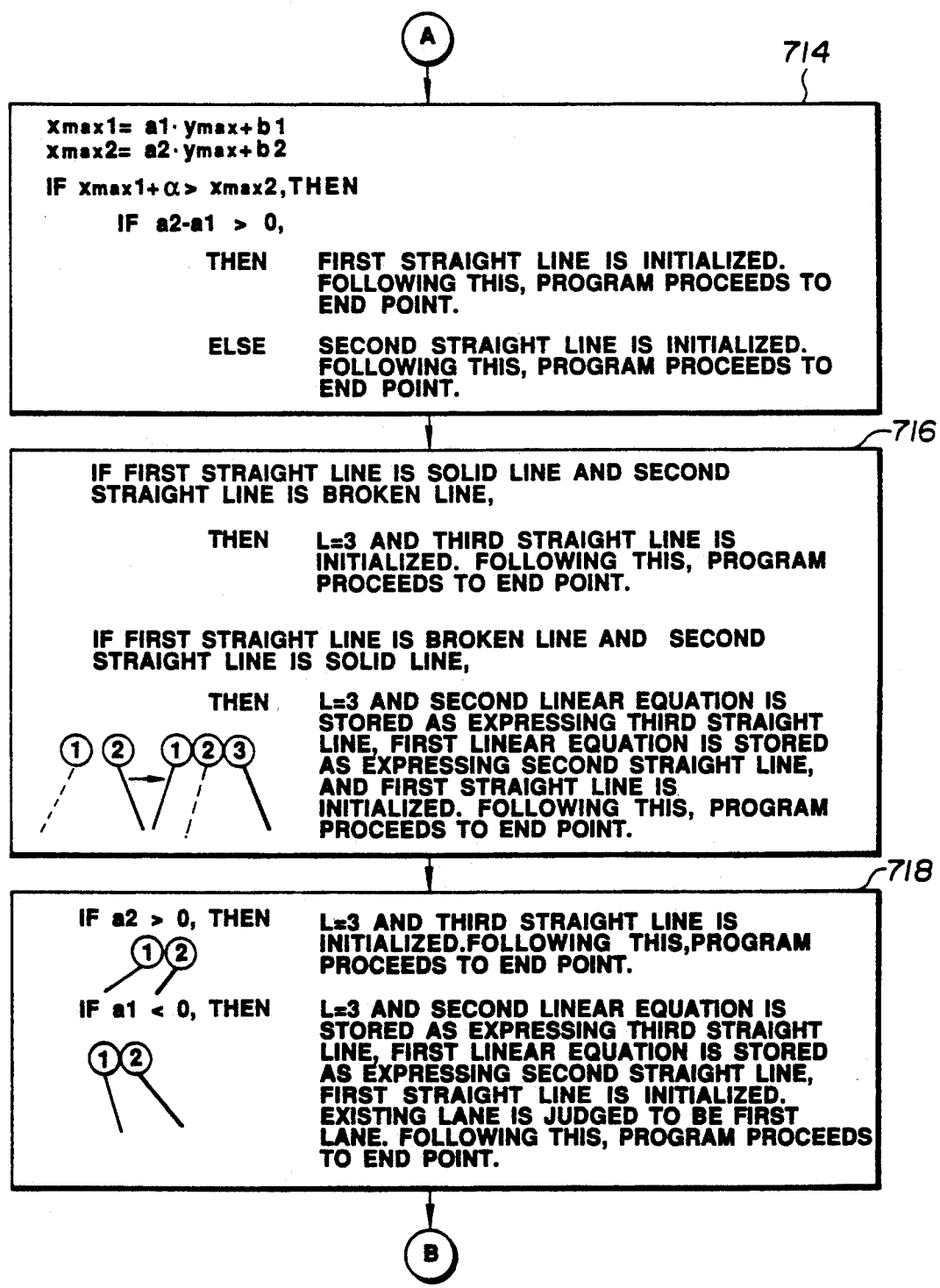
FIG. 2 is an overall flow diagram of the programming of the digital computer used in the image processing unit of FIG. 1.
FIGS. 7.1 to 7.5 are flow diagrams of the programming of the digital computer as it is used to inspect the calculated linear equations.

FIG. 2 is an overall flow diagram of the programming of the digital computer used in the image processing unit 12. It is first assumed that the road sides and/or lane markers may be represented by straight lines when the vehicle travels on an exclusive way, an express way or the like whose curves are gentle. The computer program is entered at the point 202. At the 204 in the program, various conditions used in detecting the vehicle path are initialized. In particular, the number L of the straight lines, which indicate the respective road sides and/or lane markers to be detected, is set at 2. Approximate linear equations $x = a1 \cdot y + b1$ and $x = a2 \cdot y + b2$ are set to express the first and second straight lines, respectively.

At the point 206 in the program, the image is inputted from the television camera 10 into the image memory. At the point 208 in the program, the inputted image $A(x,y)$ is converted into a pre-processed image $B(x,y)$ which is represented by a 256×240 array of edge gradient values g(x,y). This conversion is made by scanning the inputted image A(x,y) in a series of a raster scan lines to detects edge points having an intensity (brightness) distinct from the adjacent points. The edge points forms edges in the inputted image and they are candidates for the pixels representing the the road sides and/or lane markers. For this conversion, a value ΔX differentiated in the X direction and a value ΔY differentiated in the Y direction are calculated for each point or pixel A(x,y) as $$\Delta X(x,y) = \{A(x-1,y-1) + 2 \cdot A(x-1,y) + A(x-1,y+1)\} - \{A(x+1,y-1) + 2 \cdot A(x+1,y) + A(x+1,y+1)\}$$

$$\Delta Y(x,y) = \{A(x-1,y-1) + 2 \cdot A(x,y-1) + A(x+1,y-1)\} - \{A(x-1,y+1) + 2 \cdot A(x,y+1) + A(x+1,y+1)\}$$

If $|\Delta X(x,y)| + |\Delta Y(x,y)| \leq Th$ where Th is an appropriate threshold value, then it means that the existing pixel A(x,y) does not form an edge point and it is converted into B(x,y)=0. Otherwise, the existing pixel A(x,y) is converted into B(x,y)=g(x,y) given by $$g(x,y) = \text{sgn}\{\Delta X(x,y)\} \cdot \tan^{-1}\{\Delta Y(x,y)/\Delta X(x,y)\}$$

where
sgn $\{\Delta X(x,y)\}=$
1 is $\Delta X(x,y) \geq 0$
$-1$ else

The value g(x,y) is in a range of 0° to 360° and is stored in an appropriate form. The stored value g(x,y) indicates an edge gradient; that is, the gradient of the corresponding edge at the edge point B(x,y).

At the point 210 in the program, the first and second straight lines representing the road sides and/or lane markers are detected. For this purpose, candidate points B(x,y) for the pixels representing the first and second straight lines are searched by scanning the pre-processed image B(x,y) within windows set for the respective straight lines expressed by the linear equations initiated or obtained in the last cycle of execution of this program. The searched candidate points are used to calculate linear equations to express the first and second straight lines.

At the point 212 in the program, the obtained linear equations are checked to express the first and second straight lines, respectively. At the point 214 in the program, a detection is made to an obstacle on the vehicle path. At the point 216 in the program, the degree of curvature of the existing lane is measured. Following this, the program is returned to the point 206.

Figures 3, 7:
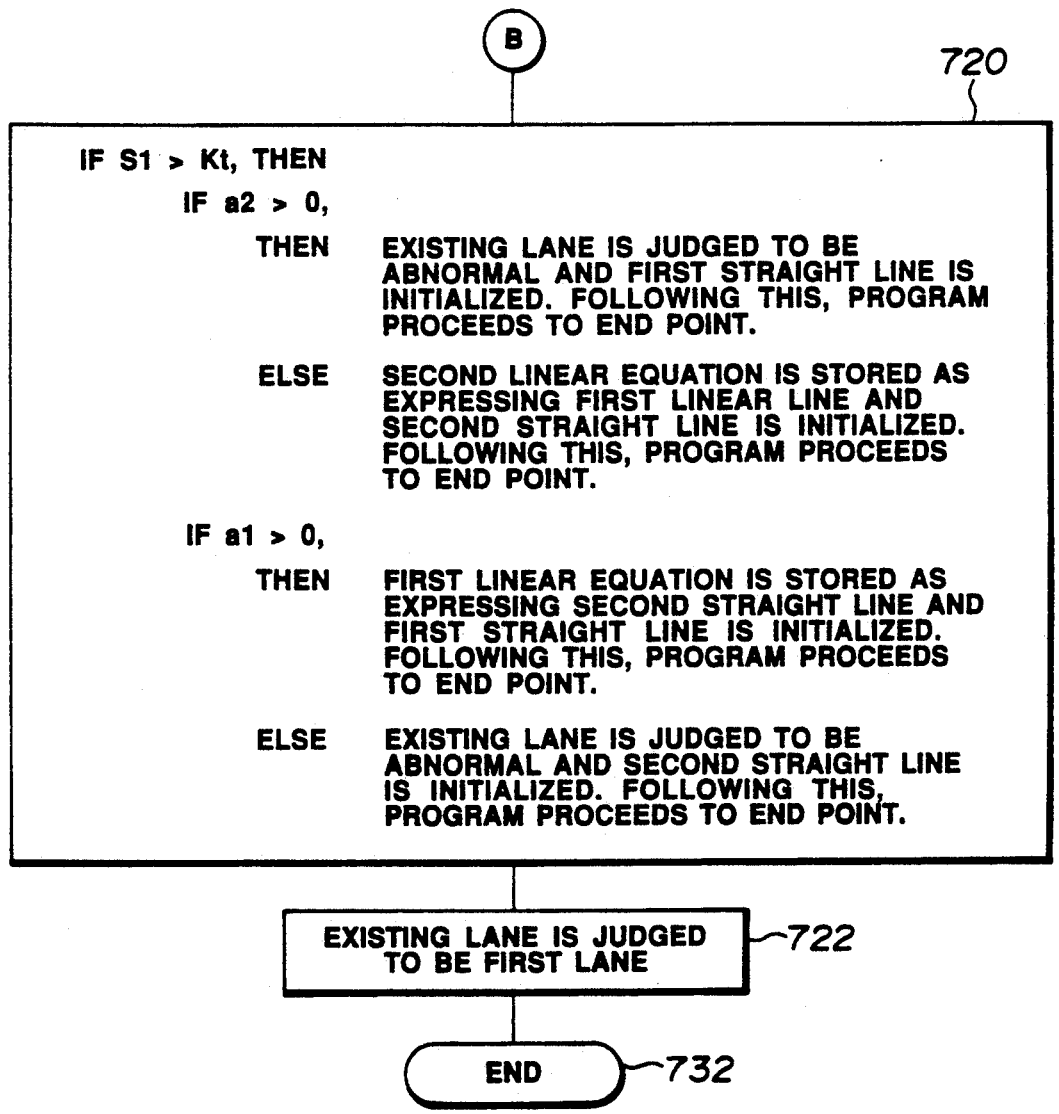
FIG. 3 is a flow diagram of the programming of the digital computer as it is used to detect the straight line representing the road sides and/or the lane markers.
Figures 5, 7:
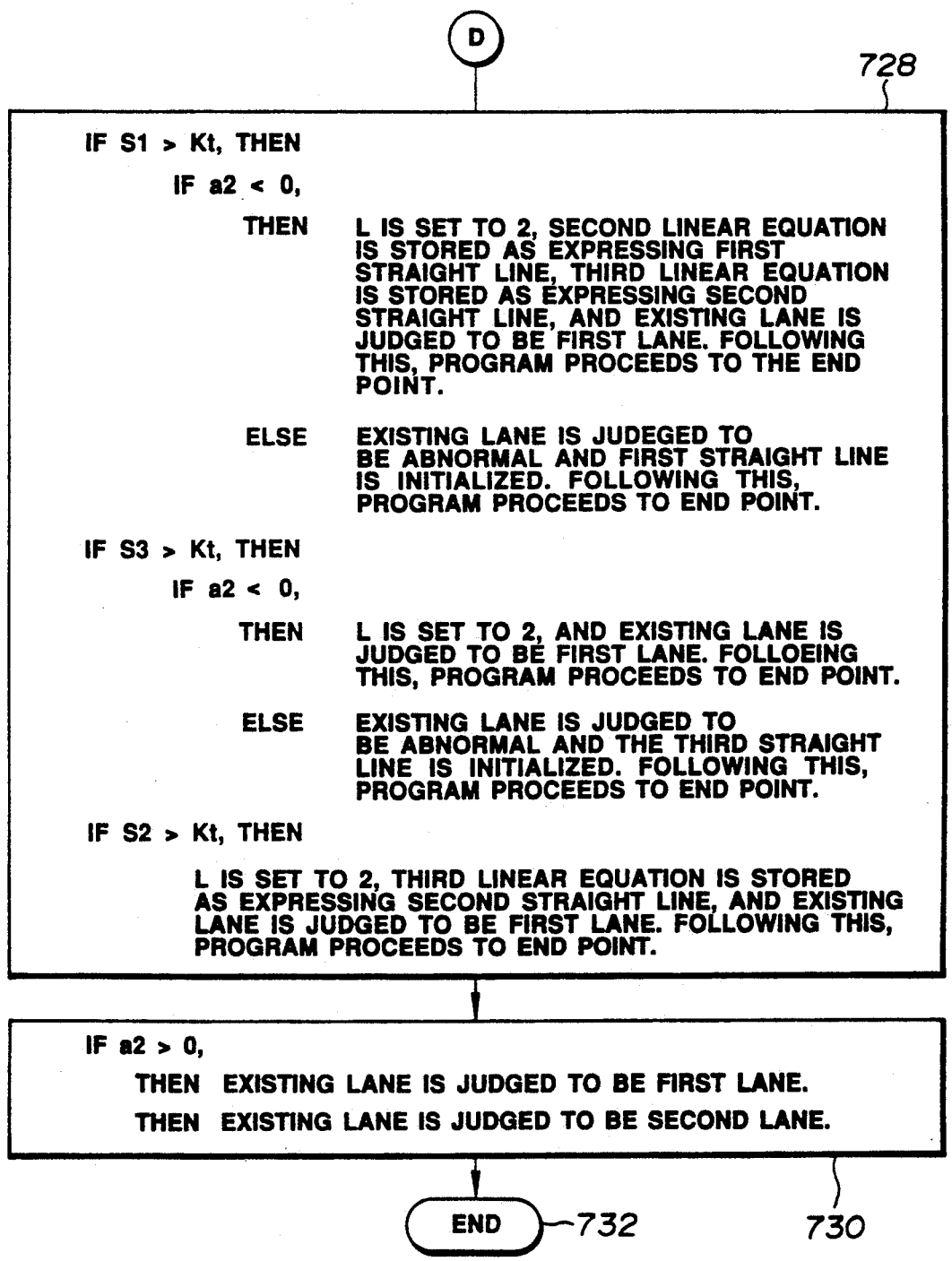

FIG. 3 is a flow diagram of the programming of the digital computer as it is used to detect the straight lines representing the road sides and/or lane markers. The computer program is entered at the point 302 which corresponds to the point 210 of FIG. 2. At the point 304 in the program, the central processing unit sets first and second windows W1 and W2 for the first and second lines to be detected. It is now assumed that the first, left straight line has been expressed by a linear equation x=a1y+b1 and the second, right straight line has been expressed by a linear equation x=a2y+b2. The first window W1 for the first straight line is given as $$a1y + b1 - \alpha < x < \frac{a1 + a2}{2} y + \frac{b1 + b2}{2}$$

where $\alpha$ is an appropriate constant (for example, 32), ymin is the Y coordinate of an appropriate uppermost point somewhat below the disappearing point of the inputted image, and ymax is the Y coordinate of an appropriate lowermost point, for example, 240. The second window W2 for the second straight line is given as $$\frac{a1 + a2}{2} y + \frac{b1 + b2}{2} < x < a2y + b2 + \alpha$$

$$ymin \leq y \leq ymax$$

If it is required to detect three straight lines representing the road sides and/or lane markers, the first, second and third windows W2, W2 and W3 may be set as follows: In this case, it is assumed that the first, leftmost straight line has been expressed by a linear equation x=a1y+b1, the second, center straight line has been expressed by a linear equation x=a2y+b2, and the third, rightmost straight line has been expressed by a linear equation x=a3y+b3. The first window W1 for the first straight line is given as $$a1y + b1 - \alpha < x < \frac{a1 + a2}{2} y + \frac{b1 + b2}{2}$$

$$ymin \leq y \leq ymax$$

The second window W1 for the second straight line is given as $$\frac{a1 + a2}{2} y + \frac{b1 + b2}{2} < x < \frac{a2 + a3}{2} y + \frac{b2 + b3}{2}$$

$$ymin \leq y \leq ymax$$

The third window W3 for the third straight line is given as $$\frac{a2 + a3}{2} y + \frac{be + b3}{2} < x < a3y + b3 + \alpha$$

$$ymin \leq y \leq ymax$$

At the point 3-6 in the program, the pre-processed image B(x,y) is scanned to search candidate points for the pixels representing the first and second straight lines and the third straight line if required. The pre-processed image B(x,y) is scanned to search the candidate points for the pixels representing first straight line within the first window W1 from right-to-left and top-to-bottom in a series of horizontal scan lines arranged every a predetermined number ypitch of points or pixels. The pre-processed image B(x,y) is scanned to search the candidate points for the pixels representing the second straight line within the second window W2 from left-to-right and top-to-bottom in a series of horizontal scan lines arranged every the predetermined number ypitch of points or pixels.

At the point 308 in the program, the detected candidate points are used to calculate linear equations expressing the first and second straight lines and the third straight line if required. The degrees of reliability of the respective linear equations are also calculated. At the point 310 in the program, a time-base filtering process is performed to correct each of the calculated linear equations. Following this, the program proceeds to the end point 312 which corresponds to the point 212 of FIG. 2.

Figure 4:
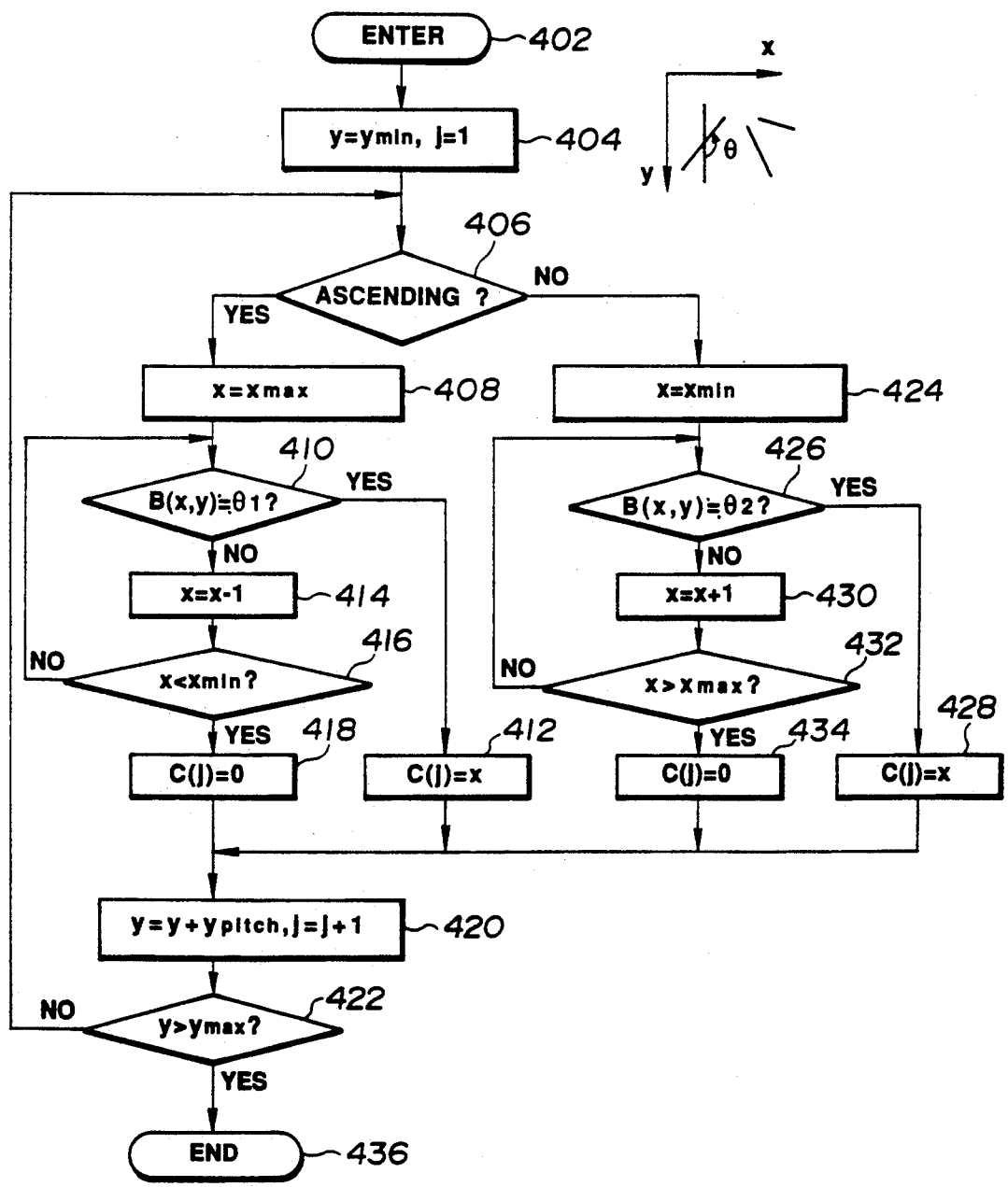
FIG. 4 is a flow diagram of the programming of the digital computer as it is used to search the candidate points for the pixels representing the first and second straight lines.

FIG. 4 is a flow diagram of the programming of the digital computer as it is used to search the candidate points for the pixels representing the first and second straight lines. At the point 402, which corresponds to the point 306 of FIG. 3, the computer program is entered. At the point 404 in the program, the y counter is set to its minimum value of ymin and the j counter is reset to its initial value of 1. At the point 406 in the program, a determination is made as to whether or not the existing straight line is an ascending straight line. If the answer to this question is "yes", then the program proceeds to the point 408 where the x counter is set to the maximum value xmas of the x coordinates of the window for the ascending straight line. At the point 410 in the program, a determination is made as to whether or not the edge gradient g(x,y) at the existing point B(x,y), which is represented by the coordinates (x,y) corresponding to the counts x and y of the x and y counters, is in a range $\theta 1$ of 105° to 165° with respective to the y coordinate axis. If the answer to this question is "yes", then it means that the existing point B(x,y) is a candidate point representing an edge point forming a part of the right side of the ascending white straight line and the program proceeds to the point 412 where the count of the x counter is stored at an address C(j) where j is the count of the j counter. Following this, the program proceeds to the point 420. If B(x,y)≦105° or B(x,y)≧165°, then the program proceeds from the point 410 to the point 414 where the x counter is incremented by one step. The program then proceeds to a determination step at the point 416. This determination is as to whether or not the count of the x counter is less than the minimum value xmin of the x coordinates of the window for the ascending straight line. If the answer to this question is "yes", then the program proceeds to the point 418 where 0 is stored at an address C(j) where j is the count of the j counter. Otherwise, the program is returned to the point 410. At the point 420 in the program, the y counter is incremented by a predetermined number ypitch of steps and the j counter is incremented by one step. At the point 422 in the program, a determination is made as to whether or not the count of the y counter is greater than the maximum value ymax. If the answer to this question is "yes", then it means the candidate point searching process has been completed for all of the points and the program proceeds to the end point 436 which corresponds to the point 308 of FIG. 3. Otherwise, the program is returned to the point 406.

If the answer to the question inputted at the point 406 is "no", then it means that the existing straight line is a descending straight line and the program proceeds to the point 424 where the x counter is set to the minimum value xmin of the x coordinates of the window for the descending straight line. At the point 426 in the program, a determination is made as to whether or not the edge gradient g(x,y) at the existing point B(x,y), which is represented by the coordinates (x,y) corresponding to the counts x and y of the x and y counters, is in a range $\theta 2$ of 15° to 75° with respective to the y coordinate axis. If the answer to this question is "yes", then it means that the existing point B(x,y) is a candidate point representing an edge point forming a part of the descending white straight line and the program proceeds to the point 428 where the count of the x counter is stored at an address C(j) where j is the count of the j counter. Following this, the program proceeds to the point 420. If B(x,y)≦15° or B(x,y)≧75°, then the program proceeds from the point 410 to the point 430 where the x counter is incremented by one step. The program then proceeds to a determination step at the point 432. This determination is as to whether or not the count of the x counter is less than the maximum value xmas of the x coordinates of the window for the descending straight line. If the answer to this question is "yes", then the program proceeds to the point 434 where 0 is stored at an address C(j) where j is the count of the j counter. Otherwise, the program is returned to the point 424.

A similar process may be made to detect the candidate points for the third straight line expressed by $x = a3y + b3$. Each candidate point for the first, right lane marker is detected when its gradient g(x,y) is in a range $\theta 1$ of 105° to 165°. Each candidate point for the second, center lane marker is detected when its gradient g(x,y) is in a range $\theta 2$ of $-75°$ to 75°. Each candidate point for the third, right lane marker is detected when its gradient g(x,y) is in a range $\theta 3$ of 15° to 75°. Each of the ranges $\theta i$ may be set as $\theta i = \tan^{-1}(1/ai) \pm \alpha$ where $\alpha$ is a predetermined value. For example, the range $\theta 3 = \tan^{-1}(1/a3) \pm \alpha$. A conversion of $\theta i$ to $\theta i \pm 180°$ permits detection of the road sides defined by stepped portions.

Figure 5:
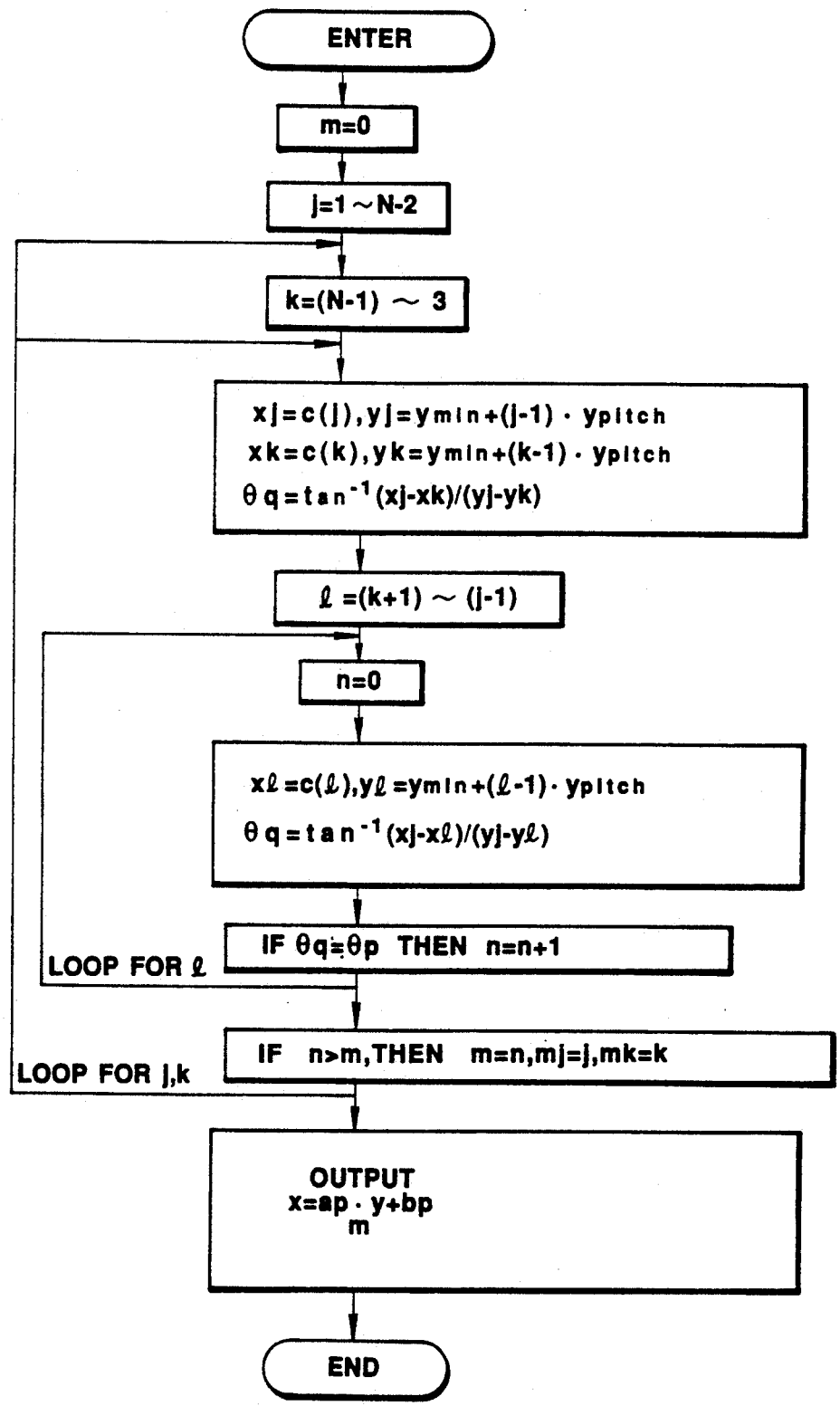
FIG. 5 is a flow diagram of the programming of the digital computer as it is used to calculate linear equations expressed the first, second and third straight lines.

FIG. 5 is a flow diagram of the programming of the digital computer as it is used to calculate linear equations expressing the first, second and third straight lines. This program corresponds to the point 308 of FIG. 3. In FIG. 5, the character N designates the number of candidate points obtained for each of the straight lines during the candidate point searching process of FIG. 4.

A desired pair of candidate points j(xj,yj) and k(xk,yk) are selected. The x coordinates xj and xj of the candidate points j(xj,yj) and k(xj,yj) are previously stored at the address C(j) and C(k), respectively during the execution of the program of FIG. 4. The y coordinates yj and yk of the candidate points j(xj,yj) and k(xk,yk) are obtained as $$yj = ymin + (j-1) \cdot ypitch$$

$$yk = ymin + (k-1) \cdot ypitch$$

The gradient $\theta q$ of the straight line extending through these two candidate points j and k is given as $$\theta q = \tan^{-1}(xj=xk)/(yj=jk)$$

Assuming now that one candidate point l(xl,yl) is selected from the candidate points located within the rectangular area defined by the x and y coordinates of the selected points j(xj,yj) and k(xk,yk), xk<xl<xj and yj<yl<yk. The gradient $\theta p$ of the straight line extending the candidate points j(xj,yj) and l(xl,yl) is calculated as xl = C(l)
yl = ymin + (l−1)·ypitch
$\theta p = \tan^{-1}(xj-xl)/(yj-jl)$ If the calculated gradient $\theta p$ is approximately equal to the gradient $\theta q$, it can be judged that the candidate point l(xl,yl) lies on the straight line extending through the candidate points j(xj,yj) and k(xk,yk). The number n of the candidate points lying on the straight line extending through the candidate points j(xj,yj) and k(xk,yk) can be obtained by repeating a similar processes for the other candidate points located within the rectangular area defined by the x and y coordinates of the selected points j(xj,yj) and k(xk,yk).

A similar process is repeated for the other pairs of candidate points j and k where j=1, 2, ... N−2 and k=N−1, N−2, ... 3 to detect a pair of candidate points j(xj,yj) and k(xk, yk) having a maximum number n=m of candidate points lying on the straight line extending the detected pair of candidate points j(xj,yj) and k(xk,yk). The straight line is represented by $$x = ap \cdot y + bp$$

where $$ap = \frac{xk - xj}{yk - yj}, \text{ and } bp = \frac{xk - xj}{yk - yj} \cdot yj + xj$$

The number n (=m) represents the degree of reliability of the calculated linear equation expressing the detected straight line. This degree n is at maximum when n=N−2.

FIG. 6 is a flow diagram of the programming of the digital computer as it is used to perform the time-base filtering process to correct the linear equations calculated at the point 308 of FIG. 3 so as to provide new linear equations expressing the road sides and/or lane markers. This program corresponds to the point 310 of FIG. 3.

It is now assumed that the last linear equation given for one of the straight lines to be detected during the last cycle of execution of the program of FIG. 2 is $$x = ai \cdot y + bi$$

and the linear equation calculated at the point 308 of FIG. 3 for the one straight line is $$x = ap \cdot y + bp$$

and the degree of reliability of the calculated linear equation is n (0≦n≦N−1).

The values xmini and xmaxi of the last linear equation at y=ymin and y=ymax are $$xmini = ai \times ymin + bi$$

$$xmaxi = ai \times ymax + bi$$

The values xmaxp and xminp of the calculated linear equation at y=ymin and y=ymax are $$xminp = ap \times ymin + bp$$

$$xmaxp = ap \times ymax + bp$$

Errors emin and emax at y=ymin and y=ymax are $$emin = xminp - xmini$$

$$emax = xmaxp - xmaxi$$

These errors emin and emax are limited within a range of −T to +T where T is a predetermined value. In other words, if the error emin is less than −T, then the error emin is set at −T, whereas if the error emin is greater than T, then the error emin is set at T. if the error emin is greater than T, then emin. Similarly, if the error emax is less than −T, then the error emax is set at −T, whereas if the error emax is greater than T, then the error emax is set at T.

Following this, the x coordinates xminq and xmaxq of new points Q1(xminq, ymin) and Q2(xmaxq, ymax) are calculated as $$xminq = \frac{n}{N-2} \cdot emin + xmini$$

$$xmaxq = \frac{n}{N-2} \cdot emax + xmaxi$$

The straight line extending through these new points Q1 and Q2 is represented as x = aq·y + bq
aq = (xminq − xmaxq)/(ymin = ymax)
bq = aq·ymin − xminq Alternatively, the straight line extending the new points (old linear equation) may be corrected as $$aq = \frac{n}{N-2} \cdot (ap - aq)$$

$$bq = \frac{n}{N-2} \cdot (bp - bq)$$

The new linear equation x=aq·y+bq is outputted. A similar process is repeated for the other straight lines to be detected. In the illustrated case, the time-base filtering process is made by calculating a weighted average of the calculated and last linear equations for which different weights are provided according to the degree n of reliability of the calculated equation. That is, the calculated equation is corrected to a greater extent when it has a greater degree n of reliability. This is effective to provide a faster response and a greater degree of reliability. It is noted, however that the time-base filtering process may be made merely by calculating an average of the calculated and last linear equations.

FIGS. 7.1 to 7.5 are flow diagrams of the programming of the digital computer as it is used to inspect the linear equations outputted at the point 210 of FIG. 2. The computer program is entered at the point 702 which corresponds to the point 212 of FIG. 2. At the point 704 in the program, all of the outputted linear equations (x=ai·y+bi where i=1 and 2 or i=1, 2 and 3) are inputted along with the respective reliability degrees ni where i=1 and 2 or i=1, 2 and 3). At the point 706 in the program, the degree ni of reliability of the ith linear equation is checked to detect an unreliable period of time Si. For this purpose, S1, S2 and S3 counters are provided. If ni<T1 where T1 is a predetermined value approximately equal to N/5, then the Si counter is reset to zero. Otherwise, the Si counter is incremented by one step. For example, the reliability degree n1 of the first linear equation x=a1·y+b1 is less than the predetermined value T1, then the S1 counter is reset to zero. Otherwise, the S1 counter is incremente by one step. The S1 counter accumulates a count indicating the number of cycles of execution of the program during which the first linear equation x=a1·y+b1 for the first straight line remains unreliable; that is, the period of time during which the first linear equation for the first straight line remains unreliable. A similar check is made for the other linear equation(s).

At the point 708 in the program, the reliability degree ni is checked to determine whether the ith straight lines expressed by the ith linear equation x =ai·y+bi is a solid or broken line. If ni>T2 where T2 is a predetermined approximately equal to N/2, then the ith straight line expressed by the ith linear equation x=ai·y+bi is a solid line. Otherwise, the ith straight line expressed by the ith linear equation x=ai·y+bi is a broken line. For example, if n1>T2, then the straight line expressed by the linear equation x=a1·y+b1 is a solid line. Otherwise, the straight line expressed by x=a1·y+b1 is a broken line.

At the point 710 in the program, the X coordinate xmini of the uppermost point (xmin, ymin) of the ith straight line expressed by the ith linear equation x=ai·y+bi is checked to detect the confidence of the ith linear equation x=ai·y+bi. If Xa<xmini<Xb where Xa and Xb are predetermined values, then it means that the uppermost point exists near the disappearing point and the ith linear equation is conficent. Otherwise, the ith straight line expressed by the ith linear equation x=ai·y+bi is initialized to produce a modified straight line and the program proceeds to the end point 732. The expression "initialized" as used throughout this invention is intended to mean "newly produced", as described in greater detail in connection in connection with FIG. 8.

At the point 712 in the program, a determination is made as to whether or not the number L of the straight lines to be detected is 2. If the answer to this question is "yes", then the program proceeds to the point 714 (FIG. 7.2). Otherwise, it means that the number L of the straight lines to be detected is 3 and the program proceeds to the point 724 (FIG. 7.4).

At the point 714 in the program, the X coordinates xmax1 and xmax2 of the lowermost points (xmax1,ymax) and xmax2, ymax) of the first and second straight lines expressed by the first and second linear equations x=a1·y+b1 and x=a2·y+b2 are calculated as $$xmax1 = a1 \cdot ymax + b1$$

$$xmax2 = a2 \cdot ymax + b2$$

The difference (xmax2−xmax1) is checked to determine whether the distance between these two lowermost points is smaller than a predetermined value α. If xmax1+α>xmax2, then it means that the two points are close to excess in spite of the fact that the first straight line is an ascending line and the second straight line is a descending line. Thus, one of the first and second straight lines is initialized. The initialized straight line has a similar gradient. That is, if a2−a1>0, then the first straight line expressed by the first linear equation x=a1·y+b1 is initialized. The second straight line expressed by the second linear equation x=a2·y+b2 is initialized if a2−a1≤0. Upon completion of the initializing process, the program proceeds to the end point 732. The initializing process will be described in connection with FIG. 8. If xmax+α≤xmax2, then the program proceeds to the point 716.

At the point 716 in the program, the first and second straight lines are checked to be solid or broken. This determination is made based upon the results obtained at the point 708. If the first straight line expressed by the first linear equation x =a1·y+b1 is a solid line and the second straight line expressed by the second linear equation x=a2·y+b2 is a broken line (which indicates the center lane marker), then it means that another straight line exists on the right side of the second straight line. Thus, L is set at 3. In addition, the third straight line is initialized or newly produced on the right side of the second straight line. Upon completion of the initializing process for the third straight line, the program proceeds to the end point 732. If the first straight line is a broken line and the second straight line is a solid line, then it means that another straight line exists on the left of the first straight line. Thus, L is set at 3. In addition, the second linear equation is stored as expressing the third straight line (right lane marker), the second linear equation is stored as expressing the second straight line (center lane marker), and the first straight line (left lane marker) is initialized or newly produced on the left of the second straight line. Following this, the program proceeds to the end point 732. If the first straight line is a solid line and the second straight line is a solid line, then the program proceeds to the point 718.

At the point 718 in the program, the gradients a1 and a2 are checked to detect the existing lane on which the vehicle is traveling. If a2>0, then it means that the vehicle is running on the right side of both of the first and second straight lines. Thus, the existing lane is judged to be the second lane. In this case, L is set at 3 and the third straight line is initialized. Following this, the program proceeds to the end point 732. If a1<0, then it means that the vehicle is traveling on the left side of both of the first and second straight lines. thus, the existing lane is judged to be the first lane. In this case, the second linear equation is stored as expressing the third straight line (right lane marker), the first linear equation is stored as expressing the second straight line (center lane marker), and the first straight line (left lane marker) is initialized. Following this, the program proceeds to the end point 732. If a1>0 and a2<0, then the program proceeds to the point 720 (FIG. 7.3).

At the point 720 in the program, the counts of the S1 and S2 counters are checked. If the count of the S1 counter provided for the first straight line is greater than a predetermined value Kt which corresponds to about 1 second, then it means that the first straight line remains unreliable for 1 second. If a2>0, then it means that the second straight line is an ascending line and the vehicle is out of the road to the left. In this case, the existing lane is judged to be abnormal and the first straight line is initialized. Following this, the program proceeds to the end point 732. If a2≤0, then it means that the second straight line is a descending line. In this case, the second linear equation is stored as expressing the first straight line and the second straight line is initialized. Following this, the program proceeds to the end point 732.

If the count of the S2 counter provided for the first straight line is greater than the predetermined value Kt, then it means that the second straight line remains unreliable for 1 second. If a1>0, then it means that the first straight line is an ascending line and the vehicle. In this case, the first linear equation is stored as expressing the second straight line and the first linear line is initialized. Following this, the program proceeds to the end point 732. If a1≤0, then it means that the first straight line is a decending line and the vehicle comes out of the road to the right. In this case, the existing lane is judged to be abnormal and the second straight line is initialized. Following this, the program proceeds to the end point 732.

If S1≤Kt and S2≤Kt, then the program proceeds to the point 722 where the existing lane is judged to be the first lane. Following this, the program proceeds to the end point 732.

At the point 724 in the program, the X coordinates xmax1, xmax2 and xmax3 of the lowermost points (xmax1,ymax), (xmax2, ymax) and xmax3, ymax) of the first, second and third straight lines expressed by the first, second and third linear equations $x=a1\cdot y+b1$, $x=a2\cdot y+b2$ and $x=a3\cdot y+b3$ are calculated as $$xmax1 = a1\cdot ymax + b2$$

$$xmax2 = a2\cdot ymax + b2$$

$$xmax3 = a3\cdot ymax + b3$$

The difference (xmax2−xmax1) is checked to determine whether the distance between these two lowermost points is smaller than a predetermined value α. If $xmax1+\alpha > xmax2$, then it means that the two points are close to excess. Thus, the first straight line is initialized. Following this, the program proceeds to the end point 732. If $xmax2+\alpha > xmax3$, then it means that the two points are close to excess. Thus, the third straight line is initialized. Following this, the program proceeds to the end point 732.

At the point 726 in the program, the first, second and third straight lines are checked to be solid or broken. This determination is made based upon the results obtained at the point 708. If the first straight line expressed by the first linear equation $=a1\cdot y+b1$ is a broken line and the second straight line expressed by the second linear equation $x=a2\cdot y+b2$ is a solid line, then the second linear equation is stored as expressing the third straight line, the first linear equation is stored as expressing the second straight line, and the first straight line is initialized. In this case, the existing lane is judged to be the second lane. Following this, the program proceeds to the end point 732.

If the third straight line is a broken line and the second straight line is a solid line, then the second linear equation is stored as expressing the first straight line (right lane marker), the third linear equation is stored as expressing the second straight line (center lane marker), and the third straight line (left lane marker) is initialized. In this case, the existing lane is judged to be the first lane. Following this, the program proceeds to the end point 732.

At the point 728 in the program, the counts of the S1, S2 and S3 counters are checked. If the count of the S1 counter provided for the first straight line is greater than the predetermined value Kt, then it means that the first straight line remains unreliable for 1 second. If $a2<0$, then the second linear equation is stored as expressed the first straight line, the third linear equation is stored as expressing the second straight line, and L is set at 2. In this case, the existing lane is judged to be the first lane. Following this, the program proceeds to the end point 732. If $a2\leq 0$, then it means that the vehicle comes out of the road to the left. Thus, the existing lane is judged to be abnormal and the first linear equation is initialized. Following this, the program proceeds to the end point 732.

If $S3>Kt$, then it means that the third straight line remains unreliable for 1 second. If $a2<0$, then L is set at 2 and the existing lane is judged to be the first lane. Following this, the program proceeds to the end point 732. If $a2\leq 0$, then it means that the vehicle comes out of the road to the right. Thus, the existing lane is judged to be abnormal and the third straight line is initialized. Following this, the program exceeds to the end point 732.

If $S2>Kt$, then L is set at 2 and the third linear equation is stored as expressing the second straight line. In this case, the existing lane is judged to be the first lane. Following this, the program proceeds to the end point 732.

At the point 730 in the program, the gradient of the second straight line is checked to detect the existing lane. If $a2>0$, then the existing lane is judged to be the first lane. Otherwise, the existing lane is judged to be the second lane. Following this, the program proceeds to the end point 732.

FIG. 8 is a flow diagram of the programming of the digital computer as it is used to perform the initializing process. It is first assumed that the straight line to be initialized is the first straight line. The X coordinates of the uppermost and lowermost points (xmin2, ymin) and (xmax2, ymax) of the second straight line are given as $$xmin2 = a2\cdot ymin + b2$$

$$xmax2 = a2\cdot ymin + b2$$

The X coordinate of a new point (xmin1, ymin) spaced a predetermined distance rmin to the X direction from the uppermost position (xmin2, ymin) is given as $$xmin1 = xmin2 - rmin$$

Similarly, the X coordinate of a new point (xmax1, ymax) spaced a predetermined distance rmax (0<rmin<rmax) to the X direction from the lowermost position (xmax2, ymax) is given as $$xmax1 = xmax2 - rmax$$

The initialized first straight line extends through these new points (xmin1, ymin) and (xmax1, ymax) and it is given as:
$x=a1\cdot y+b1$
$a1=(xmin1-xmax1)/(ymin-ymax)$
$b1=a1\cdot ymin-xmin1$
The initialized first straight line is produced on the left side of the second straight line.

It is now assumed that the straight line to be initialized is the second straight line. The X coordinates of the uppermost and lowermost points (xmin1, ymin) and (xmax1, ymax) of the first straight line are given as $$xmin1 = a1\cdot ymin + b1$$

$$xmax1 = a1\cdot ymin + b1$$

The X coordinate of a new point (xmin2, ymin) spaced the predetermined distance rmin to the X direction from the uppermost position (xmin1, ymin) is given as $$xmin2 = xmin1 + rmin$$

Similarly, the X coordinate of a new point (xmax2, ymax) spaced the predetermined distance rmax to the X direction from the lowermost position (xmax1, ymax) is given as $$xmax2 = xmax1 + rmax$$

The initialized second straight line extends through these new points (xmin2, ymin) and (xmax2, ymax) and it is given as x=a2·y+b2
a2=(xmin2−xmax2)/(ymin−ymax)
b2=a2·ymin−xmin2

The initialized second straight line is produced on the right side of the first straight line.

It is now assumed that the straight line to be initialized is the third straight line. The X coordinates of the uppermost and lowermost points (xmin2, ymin) and (xmax2, ymax) of the second straight line are given as $$xmin2 = a2 \cdot ymin + b2$$

$$xmax2 = a2 \cdot ymin + b2$$

The X coordinate of a new point (xmin3, ymin) spaced the predetermined distance rmin to the X direction from the uppermost position (xmin2, ymin) is given as $$xmin3 = xmin2 + rmin$$

Similarly, the X coordinate of a new point (xmax3, ymax) spaced the predetermined distance rmax to the X direction from the lowermost position (xmax2, ymax) is given as $$xmin3 = imax2 + rmax$$

The initialized third straight line extends through these new points (xmin3, ymin) and (xmax3, ymax) and it is given as x=a3·y+b3
a3=(xmin3−xmax3)/(ymin−ymax)
b3=a3·ymin−xmin3

The initialized third straight line is produced on the right side of the second straight line.

FIG. 9 is a flow diagram of the programming of the digital computer as it is used to detect an obstacle or an proceeding vehicle on the existing lane based upon the number of edge points existing between the straight lines defining the existing lane. For this purpose, the pre-processed image B(x,y) is scanned in a series of horizontal scan lines.

At the point 902, which corresponds to the point 214 of FIG. 2, the computer program is entered. At the point 904 in the program, i is set to 1 when the existing lane is the first lane or i is set to 2 when the existing lane is the second lane. At the point 906 in the program, the buffer yv is cleared to 0. At the point 908 in the program, the y counter is reset to its initial value ymin.

At the point 910 in the program, x1 and x2 is calculated as x1=ai·y+bi and x2=(i+1)·y+b(i+1). At the point 912 in the program, the V counter is reset to 0, the buffer xL is cleared to zero, and the buffer xR is cleared to zero. At the point 914 in the program, the x counter is reset to its initial value (x1+xo) where xo is approximately equal to (x2−x1)/8.

At the point 916 in the program, a determination is made as to whether or not the value of the existing point B(x,x), which is represented by the coordinate (x,y) corresponding to the counts x and y of the x and y counters, is 0. If the value of the point B(x,y) is not 0, then the V counter is incremented by one step. In this case, if the x coordinate of the existing point is less than the value stored in the buffer xL, then this x coordinate value is used to update the value stored in the buffer xL. If the x coordinate of the existing point is greater than the value stored in the buffer xR, then this x coordinate value is used to update the value stored in the buffer xR. If B(x,Y) is 0, then it means that the existing point is not an edge point and the program is returned to the point 916 through the loop for x where the count of the x counter is incremented by one step. These steps are repeated until the count of the x counter reaches (x2−xo+1). When the count of the x counter reaches (x2−xo+1), the program exceeds to the point 918.

At the point 918 in the program, a determination is made as to whether or not the count of the V counter is greater than a reference value Th1 and the difference of the value stored in the buffer xL from the value stored in the buffer xR is greater than a reference value Th2. If the answer to this question is "yes", then the count of the y counter is used to update the value stored in the buffer yv. Otherwise, the program is returned to the point 910 through the loop for y where the count of the y counter is incremented by one step. These steps are repeated until the count of the y counter reaches (ymax+1). When the count of the y counter reaches (ymax+1), the program proceeds to the point 920.

At the point 920 in the program, a determination is made as to whether or not the value stored in the buffer yv is zero. If the answer to this question is "yes", then the count of the u counter is reset to zero. Otherwise, the u counter is incremented by one step. The program then proceeds to the point 922. At the point 922 in the program, a determination is made as to whether or not the count of the u counter is grater than a predetermined value Kt2 which corresponds to about 0.2 seconds. If the answer to this question is "yes", then it is judged that an obstacle exists between first and second points. The x coordinate of the first point is represented by the value stored in the buffer xL and the y coordinate of the first point is represented by the value stored in the buffer yv. The x coordinate of the second point is represented by the value stored in the buffer xR and the y coordinate of the second point is represented by the value stored in the buffer yv. Following this, the program proceeds to the point 924 which corresponds to the point 216 of FIG. 2.

When the value stored in the buffer yv exceeds a predetermined value, an alarm is produced and/or the traveling vehicle is braked or the existing lane is changed when L=3. The traveling vehicle is braked when the existing lane is judged to be abnormal.

The step at the point 216 of FIG. 2 will be described in greater detail. One of the lane markers is approximated by a curve of secondary degree to measure the degree of curvature of the road. The one lane marker is represented by the right straight line when the vehicle is traveling on the right lane and by the left straight line when the vehicle is traveling on the left. The quadratic equation expressing the curve of the secondary degree is given as $$x = A \cdot y^2 + B \cdot y + C$$

where A, B and C are constants to be calculated.

The obtained candidate points are represented by the coordinates (xj,yj) where j=1, 2, 3 ... M. The approximate error ej is given as $$ej = xj - A \cdot yj^2 - B \cdot yj - C$$

The sum of the square of the error ej are calculated as follows:

$$\Sigma e_j^2 = \Sigma_j \{x_j^2 - 2Ax_jy_j^2 + A^2y_j^4 + B^2y_j^2 + 2BCy_j + C^2 - 2(Bx_jy_j + Cx_j - ABy_j^3 - ACy_j^2)\}$$

The constants A, B and C which minimize the sum of the square of the error ej are calculated as $$\frac{\alpha \Sigma e_j^2}{\alpha A} = \Sigma_j \{-x_jy_j^2 + Ay_j^4 + By_j^3 + Cy_j^2\} = 0$$

$$\frac{\alpha \Sigma e_j^2}{\alpha B} = \Sigma_j \{-x_jy_j + Ay_j^3 + By_j^2 + Cy_j\} = 0$$

$$\frac{\alpha \Sigma e_j^2}{\alpha C} = \Sigma_j \{-x_j + Ay_j^2 + By_j + C\} = 0$$

Thus, $$\begin{bmatrix} \Sigma y_j^4 & \Sigma y_j^3 & \Sigma y_j^2 \\ \Sigma y_j^3 & \Sigma y_j^2 & \Sigma y_j \\ \Sigma y_j^2 & \Sigma y_j & M \end{bmatrix} \begin{bmatrix} A \\ B \\ C \end{bmatrix} = \begin{bmatrix} \Sigma x_jy_j^2 \\ \Sigma x_jy_j \\ \Sigma x_j \end{bmatrix},$$

Thus, $$A = \frac{Da}{D}, B = \frac{Db}{D}, C = \frac{Dc}{D}$$

where $$D = \Sigma y_j^4 \cdot \Sigma y_j^2 \cdot M + \Sigma y_j^3 \cdot \Sigma y_j^2 \cdot \Sigma y_j + \Sigma y_j^3 \cdot \Sigma y_j^2 \cdot \Sigma y_j - \Sigma y_j^2 \cdot \Sigma y_j^2 \cdot \Sigma y_j^2 - \Sigma y_j^4 \cdot \Sigma y_j \cdot \Sigma y_j - \Sigma y_j^3 \cdot \Sigma y_j \cdot M$$

$$Da = \Sigma x_j \cdot \Sigma y_j^2 \cdot \Sigma y_j^2 \cdot M + \Sigma x_j \cdot \Sigma y_j^3 \cdot \Sigma y_j + \Sigma x_jy_j \cdot \Sigma y_j \cdot \Sigma y_j^2 - \Sigma x_j \cdot \Sigma y_j^2 \cdot \Sigma y_j^2 - \Sigma x_jy_j^2 \cdot \Sigma y_j \cdot \Sigma y_j - \Sigma y_jy_j \cdot \Sigma y_j^3 \cdot M$$

$$Db = \Sigma y_j^4 \cdot \Sigma x_jy_j \cdot M + \Sigma x_jy_j^2 \cdot \Sigma y_j \cdot \Sigma y_j^2 + \Sigma y_j^3 \cdot \Sigma y_j \cdot \Sigma y_j^2 - \Sigma y_j^2 \cdot \Sigma x_jy_j \cdot \Sigma y_j^2 - \Sigma x_j \cdot \Sigma y_j \cdot \Sigma y_j^4 - \Sigma x_jy_j^2 \cdot \Sigma y_j^3 \cdot M$$

$$Dc = \Sigma y_j^4 \cdot \Sigma y_j^2 \cdot \Sigma x_j + \Sigma y_j^3 \cdot \Sigma x_jy_j \cdot \Sigma y_j^2 + \Sigma y_j^3 \cdot \Sigma y_j \cdot \Sigma x_jy_j - \Sigma x_jy_j^2 \cdot \Sigma y_j^2 \cdot \Sigma y_j^2 - \Sigma x_jy_j \cdot \Sigma y_j^4 \cdot \Sigma y_j - \Sigma x_j \cdot \Sigma y_j^3 \cdot \Sigma y_j$$

The calculated constants A, B and C are time-based smoothed. That is, $$At = \alpha \cdot (A - At - 1) + At - 1$$

$$Bt = \alpha \cdot (B - Bt - 1) + Bt - 1$$

$$Ct = \alpha \cdot (C - Ct - 1) + Ct - 1$$

where At−1, Bt−1 and Ct−1 are the last values for the constants A, B and C, and At, Bt and Ct are the updated values for the constants A, B and C, and α is about 0.1. The value At indicates the degree of curvature of the curve of the road. If At>0, the road is curved to the right. If At<0, the road is curved to the left.

To perform automatic steering, the steering angle may be controlled in such a manner that the vehicle is held at a predetermined distance with respect to the left straight line when the existing lane is straight. When the existing lane is curved, the degree of curvature of the road is taken into account. In this case, the steering angle φ is calculated as $$\phi = k1 \cdot ex \, k2 \cdot At$$

where ex is the error between the x coordinate of a point (x1, y1) on the left straight line and the x coordinate of a reference point (x2, y1), At is the degree of curvature of the road, and k1 and k2 are constants.

It is to be noted that the degree At of curvature of the road may be utilized to control the directions of the head lights. For example, the direction of each of the head lights may be controlled as $$\phi = k3 \cdot At$$

What is claimed is:

1. An apparatus for detecting a vehicle path along which a vehicle is traveling, comprising:
   image input means for inputting an image of a road presented in front of the vehicle at intervals of time;
   edge point detecting means for processing the inputted image to detect edge points forming edges in the inputted image and edge gradients at the respective edge points;
   means for assuming at least one straight line having a gradient;
   means for extracting edge points at which the edge gradients are in a predetermined range determined by the gradient of the assumed straight line;
   means for calculating an approximate straight line from the extracted edge points, the approximate straight line having a greatest number of extracted edge points at which the edge gradients are substantially the same; and
   means for averaging the assumed straight line and the approximate straight line to provide a new straight line representing one of road sides and/or lane markers;
   memory means for storing the new straight line;
   the assumed straight line being a last straight line stored in the memory means just before the new straight line is stored.

2. The apparatus as claimed in claim 1, wherein the edge point extracting means includes means for setting a window near the assumed straight line, and means for searching edge points within the window to extract the edge points.

3. The apparatus as claimed in claim 1, wherein the averaging means includes means for providing a first weight for the approximate straight line and a second weight to the assumed straight line, means for increasing the first weight and decreasing the second weight as the greatest number of the extracted edge points increases, and means for averaging the weighted straight lines.

4. An apparatus for detecting a vehicle path along which a vehicle is traveling, comprising:
   image input means for inputting an image of a road presented in front of the vehicle at intervals of time;
   edge point detecting means for processing the inputted image to detect edge points forming edges in the inputted image and edge gradients at the respective edge points;
   means for assuming at least one straight line having a gradient;
   means for extracting edge points at which the edge gradients are in a predetermined range determined by the gradient of the assumed straight line;
   means for calculating an approximate straight line from the extracted edge points, the approximate straight line having a greatest number of extracted edge points at which the edge gradients are substantially the same; and means for averaging the assumed straight line and the approximate straight line to provide a new straight line representing one of road sides and/or lane markers;

the straight line assuming means including means for assuming first and second straight lines having different gradients;

the edge point extracting means including means for extracting edge points at which the edge gradients are in a first predetermined range determined by the gradient of the first assumed straight line, and means for extracting edge points at which the edge gradients are in a second predetermined range determined by the gradient of the second assumed straight line;

the approximate straight line calculating means including means for calculating a first approximate straight line from the extracted edge points, the first approximate straight line having a greatest number of extracted edge points at which the edge gradients are substantially the same in the first predetermined range, and means for calculating a second approximate straight line from the extracted edge points, the second approximate straight line having a greatest number of extracted edge points at which the edge gradients are substantially the same in the second predetermined range; and the averaging means including means for averaging the first approximate straight line and the first assumed straight line to provide a first new straight line representing one of road sides and/or lane markers, and means for averaging the second approximate straight line and the second assumed straight line to provide a second new straight line representing another road side or lane marker.

5. The apparatus as claimed in claim 4, further including means for detecting left and right lane markers defining an existing lane on which the vehicle is traveling, means for detecting edge points existing between the left and right lane markers, and means for detecting an obstacle when edge points exist continuously between the left and right lane markers for a first time.

6. The apparatus as claimed in claim 4, further including means for calculating an approximate curve of secondary degree from the edge points extracted for calculating one of the first and second approximate straight lines, and means for calculating a degree of curvature of the existing lane based upon the calculated approximate curve.

7. An apparatus for detecting a vehicle path along which a vehicle is traveling, comprising:

image input means for inputting an image of a road presented in front of the vehicle at intervals of time;

edge points detecting means for processing the inputted image to detect edge points forming edges in the inputted image and edge gradients at the respective edge points;

means for assuming at least one straight line having a gradient;

means for extracting edge points at which the edge gradients are in a predetermined range determined by the gradient of the assumed straight line;

means for calculating an approximate straight line from the extracted edge points, the approximate straight line having a greatest number of extracted edge points at which the edge gradients are substantially the same; and means for averaging the assumed straight line and the approximate straight line to provide a new straight line representing one of road sides and/or lane markers;

the straight line assuming means including means for assuming first, second and third straight lines having different gradients; the edge point extracting means including means for extracting edge points at which the edge gradients are in a first predetermined range determined by the gradient of the assumed first straight line, means for extracting edge points at which the edge gradients are in a second predetermined range determined by the gradient of the assumed second straight line, and means for extracting edge points at which the edge gradients are in a third predetermined range determined by the gradient of the assumed third straight line;

the approximate straight line calculating means including means for calculating a first approximate straight line having a greatest number of extracted edge points at which the edge gradients are substantially the same in the first predetermined range, means for calculating a second approximate straight line from the extracted edge points, the second approximate straight line having a greatest number of extracted edge points at which the edge gradients are substantially the same in the second predetermined range, and means for calculating a third approximate straight line from the extracted edge points, the third approximate straight line having a greatest number of extracted edge points at which the edge gradients are substantially the same in the third predetermined range; and the averaging means including means for averaging the first approximate straight line and the assumed first straight line to provide a first new straight line representing one of the road sides and/or lane markers, means for averaging the second approximate straight line and the assumed second straight line to provide a second new straight line representing another road side or lane marker, and means for averaging the third approximate straight line and the assumed third straight line to provide a third new straight line representing another road side or lane marker.

8. The apparatus as claimed in claim 7, further including means for detecting left and right lane markers defining an existing lane on which the vehicle is traveling, means for detecting edge points existing between the left and right lane markers, and means for detecting an obstacle when edge points exist continuously between the left and right lane markers for a first time.

9. The apparatus as claimed in claim 7, further including means for calculating an approximate curve of secondary degree from the edge points extracted for calculating one of the first, second and third approximate straight lines, and means for calculating a degree of curvature of the existing lane based upon the calculated approximate curve.

* * * * *